United States Patent
Zimmer et al.

(10) Patent No.: US 8,302,082 B2
(45) Date of Patent: Oct. 30, 2012

(54) METHODS AND APPARATUS TO PROVIDE A MANAGED RUNTIME ENVIRONMENT IN A SEQUESTERED PARTITION

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1280 days.

(21) Appl. No.: 11/422,763

(22) Filed: Jun. 7, 2006

(65) Prior Publication Data
US 2007/0288912 A1    Dec. 13, 2007

(51) Int. Cl.
G06F 9/45 (2006.01)
G06F 9/44 (2006.01)

(52) U.S. Cl. ......... 717/140; 717/120; 717/136; 717/151

(58) Field of Classification Search .................. None
See application file for complete search history.

(56) References Cited

U.S. PATENT DOCUMENTS

| | | | |
|---|---|---|---|
| 5,577,250 A | 11/1996 | Anderson et al. | |
| 5,721,945 A | 2/1998 | Mills et al. | |
| 6,247,113 B1 | 6/2001 | Jaggar | |
| 6,530,075 B1 * | 3/2003 | Beadle et al. | 717/114 |
| 6,944,746 B2 | 9/2005 | So | |
| 7,181,732 B2 * | 2/2007 | Bak et al. | 717/140 |
| 7,818,729 B1 * | 10/2010 | Plum et al. | 717/140 |
| 7,992,138 B2 * | 8/2011 | Romanovski et al. | 717/136 |
| 8,166,483 B2 * | 4/2012 | Chrabieh | 717/120 |
| 2002/0013892 A1 | 1/2002 | Gorishek, IV et al. | |
| 2002/0144241 A1 * | 10/2002 | Lueh | 717/136 |
| 2002/0144245 A1 * | 10/2002 | Lueh | 717/140 |
| 2004/0098731 A1 * | 5/2004 | Demsey et al. | 719/328 |
| 2004/0194076 A1 * | 9/2004 | Comp et al. | 717/158 |
| 2005/0055594 A1 | 3/2005 | Doering et al. | |
| 2005/0055677 A1 * | 3/2005 | Nanja et al. | 717/136 |
| 2005/0081010 A1 * | 4/2005 | DeWitt et al. | 711/165 |
| 2005/0083761 A1 * | 4/2005 | Ginosar | 365/222 |
| 2006/0112377 A1 * | 5/2006 | Nacul et al. | 717/140 |
| 2006/0117172 A1 * | 6/2006 | Zhang et al. | 713/2 |
| 2006/0259815 A1 * | 11/2006 | Graham et al. | 714/11 |
| 2007/0174689 A1 * | 7/2007 | Chen | 714/13 |
| 2007/0288912 A1 | 12/2007 | Zimmer et al. | |
| 2008/0222621 A1 * | 9/2008 | Knight et al. | 717/151 |

OTHER PUBLICATIONS

Schultz et al., Compiling java for low-end embedded systems, Jul. 2003, 9 pages, <http://delivery.acm.org/10.1145/790000/780739/p42-schultz.pdf>.*

Debbabi et al., A dynamic compiler for embedded Java virtual machines, Jun. 2004, 7 pages, <http://delivery.acm.org/10.1145/1080000/1071584/p100-debbabi.pdf>.*

(Continued)

*Primary Examiner* — Thuy Dao
(74) *Attorney, Agent, or Firm* — Hanley, Flight & Zimmerman, LLC

(57) ABSTRACT

Apparatus and methods of managed runtime in an embedded partition are disclosed. An example processor system has a general partition having a central processing unit (CPU) to run a first operating system. An embedded partition has a second central processing unit (CPU) to run a second operating system. An inter-partition bridge exchanges an instruction between the general partition and the embedded partition. The first operating system includes a managed runtime environment filter to evaluate the instruction and determine whether the embedded partition can process the instruction.

14 Claims, 3 Drawing Sheets

OTHER PUBLICATIONS

Di Giore et al., JIT compiler optimizations for stack-based processors in embedded platforms, Oct. 2006, 6 pages, <http://delivery.acm.org/10.1145/1170000/1168034/p212-di_giore.pdf>.*

United States Patent and Trademark Office, "Office Action for U.S. Appl. No. 11/564,086," Jan. 20, 2010, 43 pages.

United States Patent and Trademark Office, "Office Action for U.S. Appl. No. 11/564,086," Jun. 30, 2010, 33 pages.

"Intel Multi-Core Processor Architecture Development Backgrounder," Copyright 2005, 6 pages.

Feldman, Michael, "HyperTransport Stays Ahead of the Curve", HPCwire, May 5, 2006, downloaded on Oct. 23, 2006 from http://www.hpcwire.com/hpc/646006.html, 3 pages.

Hannibal, "Intel has a major '06-'07 weak spot, and AMD is aiming right at it", ars Technica, Jan. 6, 2006, downloaded on Oct. 23, 2006 from http://arstechnica.com/news.ars/post/20060106-5920.html, 4 pages.

Feldman, Michael, "AMD's Phil Hester Charts for the Future", HPCwire, Jan. 13, 2006, downloaded on Oct. 23, 2006 from http://news.taborcommunications.com/msgget.jsp?mid=540380&xsl=story.xsl, 4 pages.

UEFI—UEFI Specifications and Tools, Copyright UEFI 2005-2006, downloaded on Oct. 23, 2006, from http://www.uefi.org/index.php?pg=4, 1 page.

"DRC Announces Reconfigurable Coprocessor for Accelerated Supercomputing", May 2, 2006, 2 pages.

Vance, Ashlee, "Start-up could kick Opteron into overdrive", The Register, Apr. 21, 2006, downloaded on Oct. 23, 2006, from http://www.theregister.co.uk/2006/04/21/drc_fpga_module/print.html, 4 pages.

"Welcome to TianoCore.org", downloaded on Oct. 23, 2006, from https://www.tianocore.org/, 2 pages.

Vincent J. Zimmer and Michael A. Rothman, U.S. Appl. No. 11/530,246, entitled "System, Method and Apparatus to Accelerate Raid Operations", filed on Sep. 8, 2006, 25 pages.

Vincent J. Zimmer and Michael A. Rothman, U.S. Appl. No. 11/422,763, entitled "Methods and Apparatus to Provide a Managed Runtime Environment in a Sequestered Partition", filed on Jun. 7, 2006, 21 pages.

Vincent J. Zimmer and Michael A. Rothman, U.S. Appl. No. 11/475,626, entitled "Methods and Apparatus to Audit a Computer in a Sequestered Partition", filed on Jun. 27, 2006, 32 pages.

Michael A. Rothman and Vincent J. Zimmer, U.S. Appl. No. 11/394,481, entitled "System, Method and Apparatus to Aggregate Heterogeneous Raid Sets", filed on Mar. 31, 2006, 23 pages.

Vincent J. Zimmer, Michael A. Rothman and Steven McGowan, U.S. Appl. No. 11/449,254, entitled "Supporting Flash Access in a Partitioned Platform", filed on Jun. 7, 2006, 30 pages.

Michael A. Rothman and Vincent J. Zimmer, U.S. Appl. No. 11/517,195, entitled "System and Method to Enable Prioritized Sharing of Devices in Partitioned Environments", filed on Sep. 5, 2006, 31 pages.

Michael A. Rothman and Vincent J. Zimmer, U.S. Appl. No. 11/478,012, entitled "Method and Apparatus for OS Independent Platform Recovery", filed on Jun. 29, 2006, 32 pages.

Vincent J. Zimmer and Lyle Cool, U.S. Appl. No. 11/527,180, entitled "Methods and Arrangements to Launch Trusted, Co-Existing Environments", filed on Sep. 26, 2006, 37 pages.

Cockerell, ARM Assembly Language Programming, 1987, Appendix A, 11 pages.

Extensible Firmware Interface Specification, Intel Corporation, Version 1.10, Dec. 1, 2002, 1084 pages.

Extensible Firmware Interface Specification, Version 1.10, Specification Update, Intel Corporation, Version-001, Nov. 26, 2003, 63 pages.

Wenzhang Zhu, Cho-Li Wang, Weijian Fang and Francis C.M. Lau, "A New Transparent Java Thread Migration System Using Just-In-Time Recompilation", 6 sheets, 2004.

* cited by examiner

METHODS AND APPARATUS TO PROVIDE A MANAGED RUNTIME ENVIRONMENT IN A SEQUESTERED PARTITION

FIELD OF THE DISCLOSURE

This disclosure relates generally to processor management and, more particularly, to methods and apparatus to provide a managed runtime environment in a sequestered partition.

BACKGROUND

The use of new computer languages in the context of web support such as Extensible Markup Language (XML), Sun Java and Microsoft common language runtime (CLR) intermedial language, represent new types of workloads that cannot be best supported by compilers that are run on general-purpose, multiple address space (MAS) operating systems. Attempts to design specialized hardware processor cores to accelerate compilation of specific applications and maintain the confidentiality and proprietary nature of these designs are often thwarted because in order to operate with general purpose operating systems, general purpose operating system developers must be provided the details of the specialized hardware processor core. Thus, the confidential and proprietary value of such specialized hardware processor core designs is often lost. Further, the general execution environment cannot exploit non-standard instruction set architecture (ISA) extensions, different Just-in-Time (JIT) compilers, garbage collectors, and other artifacts that may be most efficiently run on specially designed hardware cores.

One approach to address these issues has been to install specialized core processors such as co-processors developed by third-party chipmakers that can be dropped into a coherent hyper-threading (HT) socket. Such co-processors are designed to begin working gluelessly with the other processors in the system. For example, a Java+XML accelerator co-processor may be installed into one socket of a multi-processor system. Such a configuration could be used with a datacenter web server having, a general processor in one socket and a Java+XML coprocessor in another socket. However, such solutions still require the interface with general operating systems and, thus, do not fully use the optimization of a processor core design because the specialized core is limited by the general operating system.

DETAILED DESCRIPTION

In general, methods and apparatus to provide a managed runtime environment in a sequestered partition are disclosed herein. An example processor system has a general partition having a central processing unit (CPU) to run a first operating system. An embedded partition has a second central processing unit (CPU) to run a second operating system. An inter-partition bridge is provided to exchange an instruction between the general partition and the embedded partition. The first operating system includes a managed runtime environment filter to evaluate the instruction and determine whether the embedded partition can process the instruction.

Another example is a method of accelerating execution of an instruction. A first operating system is run to read the instruction. An inter-partition bridge is used to transmit the instruction to an embedded partition. The instruction is processed in the embedded partition with a second operating system.

Another example is an article of manufacture storing machine readable instructions which, when executed, cause a processor system to run a first operating system to read an instruction. The instruction is transmitted via an inter-partition bridge to an embedded partition. The instruction is processed in the embedded partition with a second operating system.

Figure 1:
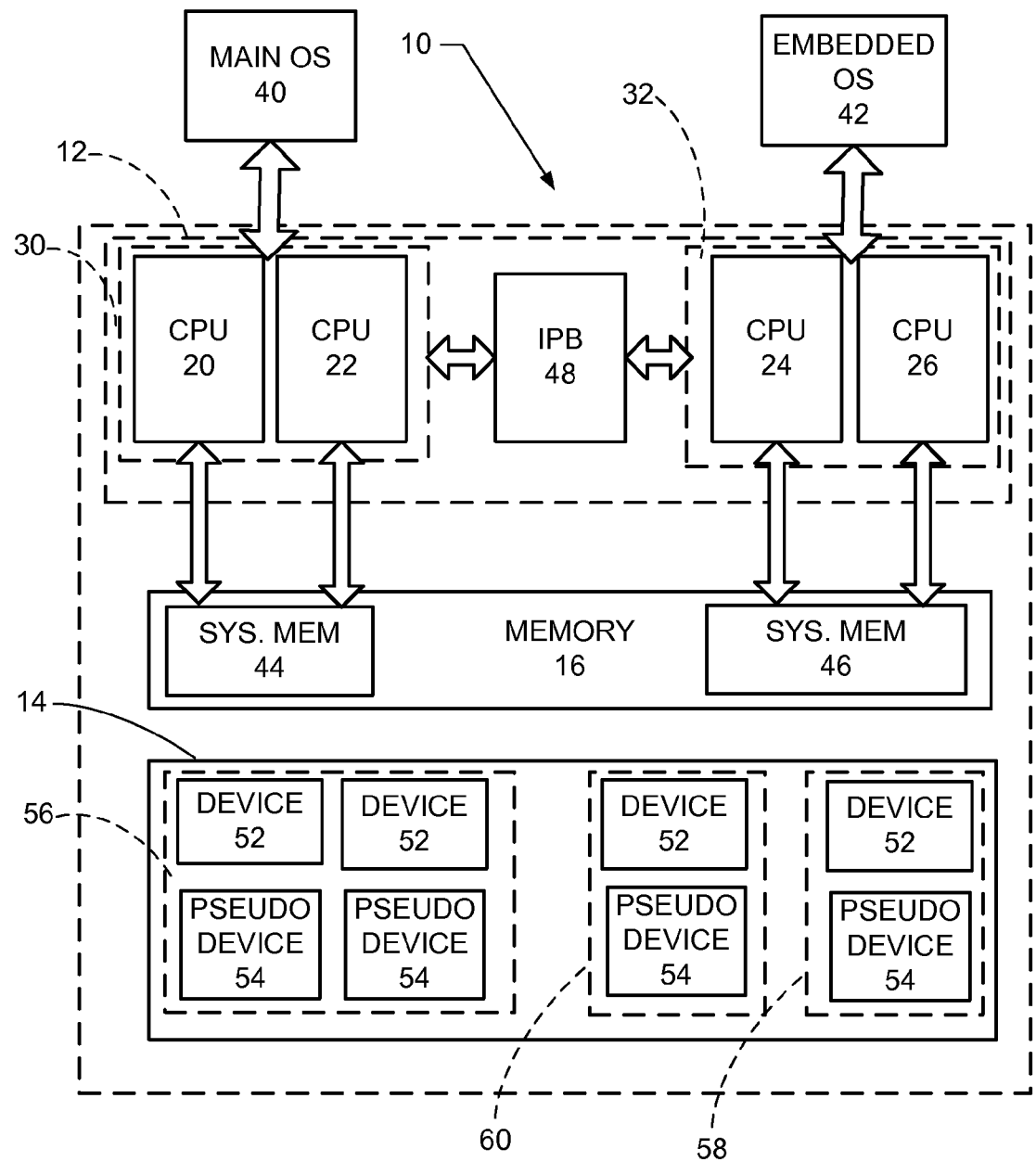
FIG. 1 is a block diagram of an example processor system that uses a managed runtime environment in an example sequestered partition.

FIG. 1 is a block diagram of an example processor system 10. The processor system 10 may generally include a multiple core (multi-core) processor 12, a hardware block 14 and a system memory 16. The multi-core processor 12 may include any variety of processors having a plurality of cores, for example, an Intel® Pentium® D dual core processor. The multi-core processor 12 is an integrated circuit (IC), such as a semiconductor integrated circuit chip.

In this example, the multi-core processor 12 includes a plurality of core central processing units (CPU), which in this example, are shown as CPU 20, CPU 22, CPU 24 and CPU 26. Of course, additional or fewer processor cores may be used for the CPUs. The multi-core processor 12 may be logically and/or physically divided into a plurality of partitions. For example, in this example, the multi-core processor 12 may be divided into a general partition 30 including the CPU 20 and the CPU 22. The multi-core processor 12 of FIG. 1 also includes an embedded or sequestered partition 32 including the CPU 24 and the CPU 26.

In the illustrated example, the general partition 30 executes a main operating system (OS) 40, which may include, for example, a general operating system such as Windows XP, Linux, etc. The embedded partition 32 is capable of executing an embedded OS 42, which is a sequestered runtime operating system, such as ThreadX® or Embedded Linux in this example. The main OS 40 includes a managed runtime environment (MRTE) filter that manages the actions of commands which may be processed by the embedded partition 32. The embedded OS 42 and the CPU 24 and CPU 26 may be optimized for a specific application, such as a virtual machine. Virtual machine examples include a Java virtual machine (JVM) such as Hotspot or Intel ORP for just in time (JIT) compilation of Java code. This allows compilation of Java code, the results of such compilation may then be executed by the main OS 40. Another example virtual machine application may be for acceleration of common language runtime (CLR) intermedial language instructions.

The system memory 16 may include one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, the system memory 16 may be other and/or later-developed types of computer-readable memory. Machine-readable firmware program instructions may be stored in the system memory 16. As described below, these instructions may be accessed and executed by the CPUs in the general partition 30 and/or the embedded partition 32 of the multi-core processor 12. When executed by the CPUs, these instructions may result in multi-core processor 12 performing the operations described herein as being performed by the multi-core processor 12 such as the main OS 40 and/or the embedded OS 42.

In this example, the system memory 16 may be logically and/or physically partitioned into a first system memory 44 and a second system memory 46. The first system memory 44 may store commands, instructions, and/or data for operation of the general partition 30 such as the main OS 40, and the second system memory 46 may store commands, instructions, and/or data for execution on the embedded partition 32, such as execution of the embedded OS 42 and/or execution of a JIT compiler. The general partition 30 and embedded partition 32 communicate through an inter-partition bridge (IPB) 48. The IPB 48 in this example is a shared memory between the general partition 30 and the embedded partition 32. Alternatively, the IPB 48 may be a hardware-oriented interconnect such as input/output controller.

The hardware block 14 may include integrated circuit chips, such as those selected from integrated circuit chipsets (e.g., graphics memory and I/O controller hub chipsets), although other integrated circuit chips may also, or alternatively, be used. The hardware block 14 has devices 52 and pseudo-devices 54 that may include controllers, storage devices, media cards (video, sound, etc.) and/or network cards. The pseudo-devices 54 are emulated devices. Certain devices 52 and pseudo devices 54 are designated as a general hardware block 56 that are controllable only by the CPUs in the general partition 30. Certain devices 52 and pseudo-devices 54 are designated as an embedded hardware block 58 that are controllable only by the CPUs in the embedded partition 32. Certain devices 52 and pseudo-devices 54 are designated as a shared hardware block 60 which are controllable by the CPUs in the general partition 30 and the embedded partition 32. The shared hardware block 60 may include an inter-partition bridge (IPB) circuit if the IPB 48 is implemented in hardware in the form of an I/O controller, for example.

The main OS 40 may be capable of generating one or more I/O requests (e.g., read and/or write requests) directed to the devices 52 and pseudo-devices 54 in the hardware block 14. To that end, the general partition 30 may be capable of communicating with the hardware block 14 using a plurality of communication protocols. For example, the general partition 30 may be capable of communicating with the device 52 or pseudo device 54 using the serial advanced technology attachment (SATA) communications protocol and/or parallel advanced technology attachment (PATA) communications protocol.

In response to an I/O request generated by the main OS 40, the general partition 30 may be directed to a hardware device in the shared hardware block 60. The IPB 48 may generate an interrupt to the embedded partition 32 to process the I/O request generated by the main OS 40. In response to the interrupt generated by the IPB 48, the embedded partition 32 will translate the I/O request from the communication protocol as may be generated by the general partition 30 into a communication protocol compatible with the device corresponding to the I/O request. Once the I/O transaction is complete (or if the I/O transaction fails), the embedded partition 32 reports the status of the I/O transaction to the general partition 30, via the IPB 48. Each of the CPUs 24 and 26 has a respective interface to hardware, such as a peripheral component interconnect (PCI) interface, which allows access to the pseudo devices or real devices in the shared hardware block 60.

Figure 2:
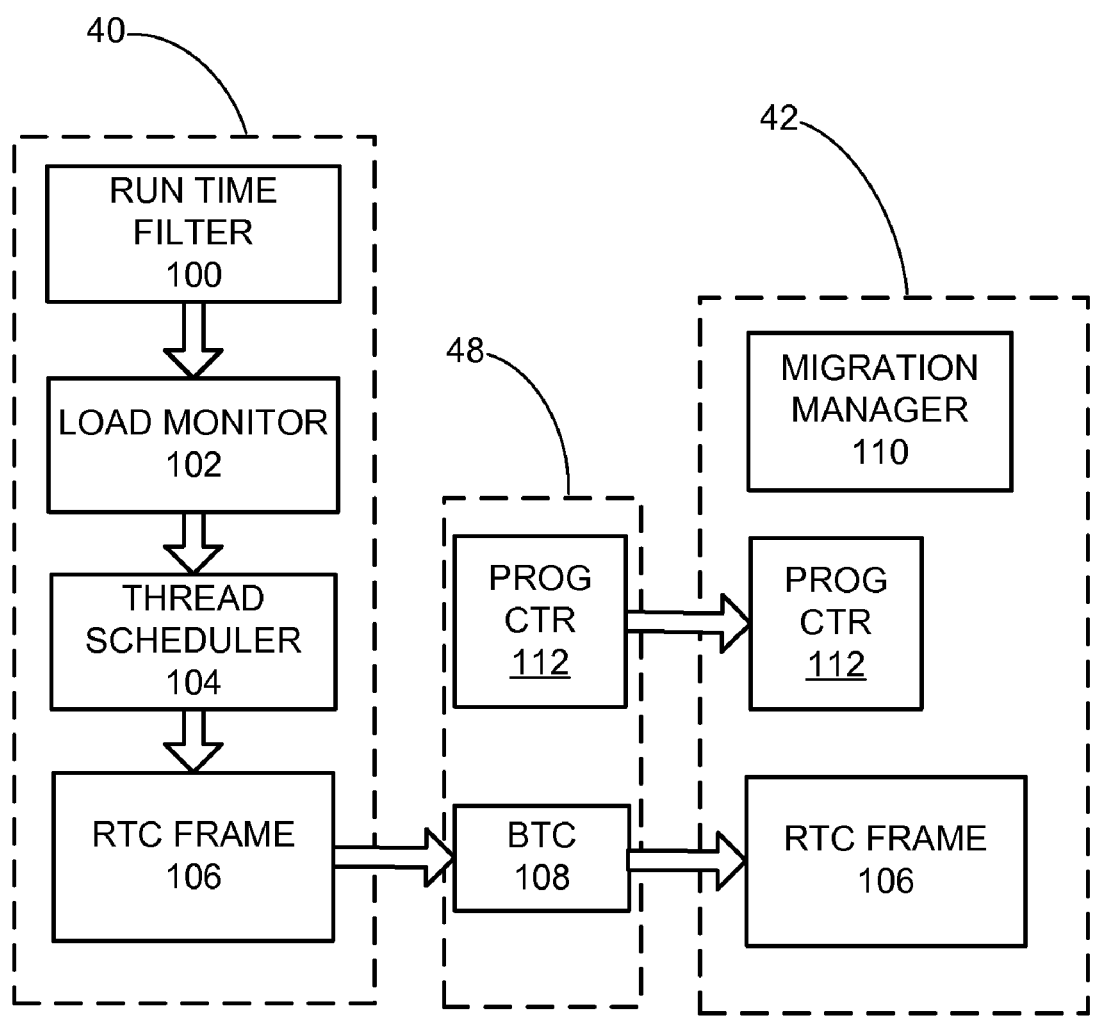
FIG. 2 is block diagram representing the processing of instructions by a general partition and the sequestered partition in the example processor system in FIG. 1.

FIG. 2 is a block diagram of an example CPU 24 of the embedded partition 32 used as an example Java virtual machine (JVM) in conjunction with the general partition 30. The general partition 30 uses the general OS 40 which includes a managed runtime environment (MRTE) filter 100, a load monitor 102 and a thread scheduler 104. The MRTE filter 100 determines whether an instruction may be processed by the embedded partition 32. In the illustrated example, the MRTE filter 100 determines whether the incoming instruction is a Java instruction. Those of ordinary skill in the art will recognize that other types of instructions may be detected by the MRTE filter 100 for processing by the embedded partition 32 depending on the specialized functions of the embedded partition 32. If the instruction may be processed by the embedded partition 32, the general partition 30 can pass the instruction to the IPB 48 and proceed with other tasks.

The load monitor 102 alerts the thread scheduler 104 of an incoming instruction. In this example, the load monitor 102 receives the Java instruction and thus the multi-core processor 12 will use the embedded partition 32 to accelerate compilation of the Java instruction. Alternatively or in conjunction, the embedded partition may also provide more efficient compilation of the Java instructions into native code. A raw thread context (RTC) frame 106 is created by the thread scheduler 104 by stack analysis and stack capturing. The RTC frame 106 is translated into a bytecode-oriented thread context (BTC) 108 or multiple BTCs for transmission to the embedded partition 32 via the IPB 48. The BTC 108 contains the thread ID, frames, class names, method signature, program counter, operands stack pointer, and local variables encoded in a JVM independent format.

The BTC 108 is received by a migration manager 110 which is part of the embedded OS 42 run by the embedded partition 32. The migration manager 110 parses the frames and restores the frames to the original RTC frame 106. A program counter 112 serves as the real instruction pointer for the underlying hardware such as the CPUs 24 and 26. The original RTC frame 104 is then processed by an application loaded from the system memory 46 by a CPU such as the CPU 24 or CPU 26 of the embedded partition 32. In this example the Java instruction in the original RTC frame is compiled to native code using a just in time compiler loaded from the system memory 46 by the CPU 24. The embedded partition 32 then passes the native code to the general partition 30 for execution. The hardware design of the CPU 24 may also be optimized to maximize performance of specific types of computer instructions such as for example Java compilers.

Figure 3:
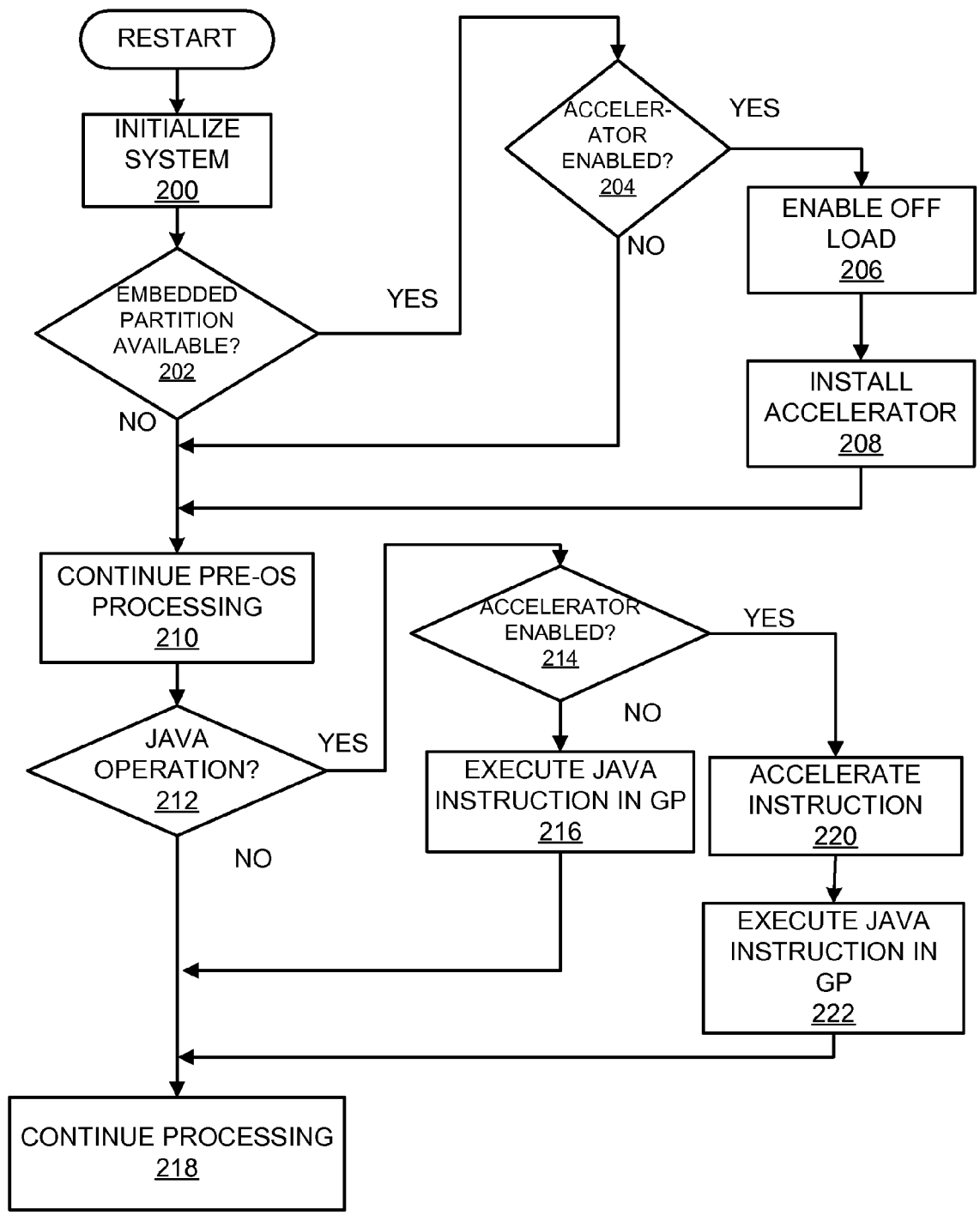
FIG. 3 is a flow diagram representation of an example machine readable instruction which may be executed to process specialized instructions.

FIG. 3 illustrates a flowchart representative of example machine accessible instructions that may be executed to implement the example embedded partition 32 of FIGS. 1 and/or 2. The example machine accessible instructions of FIG. 3 may be executed by a processor, a controller and/or any other suitable processing device. For example, the example machine accessible instructions of FIG. 3 may be embodied in coded instructions stored on a tangible medium such as a flash memory, or random access memory (RAM) associated with a processor. Alternatively, some or all of the example flowchart of FIG. 3 may be implemented using an application specific integrated circuit (ASIC), a programmable logic device (PLD), a field programmable logic device (FPLD), discrete logic, hardware, firmware, etc. Also, some or all of the example flowchart of FIG. 3 may be implemented manually or as combinations of any of the foregoing techniques, for example, a combination of firmware, software and/or hardware. Further, although the example machine accessible instructions of FIG. 3 are described with reference to the flowchart of FIG. 3, persons of ordinary skill in the art will readily appreciate that many other methods of implementing the example embedded partition 32 of FIGS. 1 and/or 2 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 3 be carried out sequentially and/or carried out in parallel by, for example, separate processing threads, processors, devices, circuits, etc.

FIG. 3 is a flowchart illustrating the example operation of the embedded partition 32 in the processor system 10 for processing specific types of computer instructions, such as, operating a just in time Java compiler for Java instructions. In this example, the processor system 10 starts by initializing the main OS 40 (block 200). The startup process determines whether the embedded partition 32 is available (block 202). If the embedded partition 32 is available, the system determines whether the manage runtime environment controller 100 in FIG. 2 is enabled (block 204). If the manage runtime environment controller 204 is enabled, the main OS 40 sends a command to the embedded partition 32 via the IPB 48 to load the just in time compiler from the system memory 46 (block 206). The just in time compiler in this example is an acceleration application for Java and is installed in the system memory 46 for use by the CPUs in the embedded partition 32 (block 208). The process then continues to boot the main OS 40 (block 210).

If either the embedded partition 32 is unavailable or the manage runtime environment filter 100 is not enabled, the system continues to boot the main OS 40 (block 210). During each instruction request to the main OS 40, the MRTE filter 100 of the main OS 40 determines whether an instruction may be processed by the embedded partition 32 (block 212). In this example, the MRTE filter 100 determines whether the instruction request is Java bytecode. Of course those of ordinary skill in the art will appreciate that other single or multiple specialized operations may be supported by the embedded partition 32 such as XML acceleration, CLR intermedial language compilation etc. The main OS 40 determines whether the acceleration application is enabled in the embedded partition 32 (block 214). If the acceleration application is not enabled, the main OS 40 uses the CPUs of the general partition (GP) 30 to execute the operation (block 216) and returns to processing other instructions (block 218).

If the acceleration application is enabled, the main OS 40 creates a runtime thread context (RTC) 106 via the thread scheduler 104 in FIG. 2 and passes the operation via the IPB 48 to the embedded partition 32 for just in time compilation (block 220). One of the CPUs of the embedded partition 32 runs the acceleration application, in this example a JIT compiler (block 220) independent of the operation of the CPUs of the general partition 30. Thus, the general partition 30 may execute other instructions. A CPU of the general partition 30 such as the CPU 20 then executes the compiled Java instruction (block 222).

The separation of the embedded partition 32 and the use of the IPB 48 allow use of hidden architectures unknown to the main operating system 40. Use of the embedded partition 32 is opaque to the main operating system 40, thus allowing processor designers of CPUs in the embedded partition 32 to keep hardware details hidden from the software designers of the main operating system 40. Such hardware designs may be tailored to optimize performance for specific functions such as executing certain computer instructions and/or languages. Those of ordinary skill in the art will appreciate that the processor system is also flexible in that different processors may be used for the embedded partition. The embedded partition may also be updated and use a more advanced processing using non-standard architectures for example or operating systems which have superior processing of a workload than the general partition without having to make modifications to the general operating system on the general partition.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A processor system, comprising:
   a general partition having a central processing unit (CPU), the general partition including a load monitor to receive an instruction;
   an embedded partition having a second CPU;
   an inter-partition bridge (IPB) in communication with the general partition and the embedded partition to pass an instruction from the general partition to the embedded partition;
   a thread scheduler to create a raw thread context (RTC) frame from the instruction and to translate the RTC frame into a bytecode-oriented thread context (BTC) for transmission to the embedded partition via the IPB;
   a managed runtime environment filter to evaluate the instruction and pass the instruction via the IPB when the embedded partition can process the instruction; and
   an operating system executing on the general partition to determine whether an acceleration application is enabled on the embedded partition, to invoke the embedded partition to compile the instruction when the acceleration application is enabled on the embedded partition, and to initiate execution of the instruction on the general partition when the acceleration application is not enabled.

2. The processor system of claim 1 wherein the IPB is a shared memory accessible by the general partition and the embedded partition.

3. The processor system of claim 1 wherein the IPB is a hardware input/output controller accessible by the general partition and the embedded partition.

4. The processor system of claim 1 wherein the second CPU of the embedded partition is to improve execution of a function.

5. The processor system of claim 4 wherein the function is just in time compilation.

6. The processor system of claim 1 further comprising a memory accessible by the embedded partition, the memory storing an application comprising one of a Java virtual machine or a common language run time (CLR) intermedial language compiler.

7. The processor system of claim 1 wherein the instruction is one of an XML instruction, a CLR intermedial instruction, or a Java instruction.

8. The processor system of claim 1
   further comprising a migration manager to restore the RTC frame from the BTC.

9. The processor system of claim 1 further comprising:
   a first hardware device exclusively controllable by a first OS on the general partition; and
   a second hardware device exclusively controllable by a second OS on the embedded partition.

10. A tangible machine readable storage medium comprising instructions which, when executed, cause a processor system to, at least:

run a first operating system executing on a general partition to read an instruction;
create a raw thread context (RTC) frame from the instruction;
identify whether an embedded partition includes an enabled acceleration application that can process the instruction;
translate the RTC into a bytecode-oriented thread context (BTC) for transmission to the embedded partition;
transmit the instruction via an inter-partition bridge to the embedded partition in response to identifying the enabled acceleration application;
process the instruction with the embedded partition with a second operating system when the acceleration application is enabled; and
process the instruction with the first operating system with the general partition when the acceleration application is not enabled.

11. The machine readable storage medium of claim 10 which when executed further causes the processor system to process the instruction using just in time compilation.

12. The machine readable storage medium of claim 10 wherein the second operating system is to run an application to process the instruction, the application comprising at least one of a Java virtual machine or a common language run time (CLR) intermedial language compiler.

13. The machine readable storage medium of claim 10 wherein the instruction is at least one of an XML instruction, a CLR intermedial language instruction, or a Java instruction.

14. The machine readable storage medium of claim 10 storing instructions which, when executed, cause a processor system to
restore the RTC from the BTC in the embedded partition.

* * * * *